UNITED STATES PATENT OFFICE.

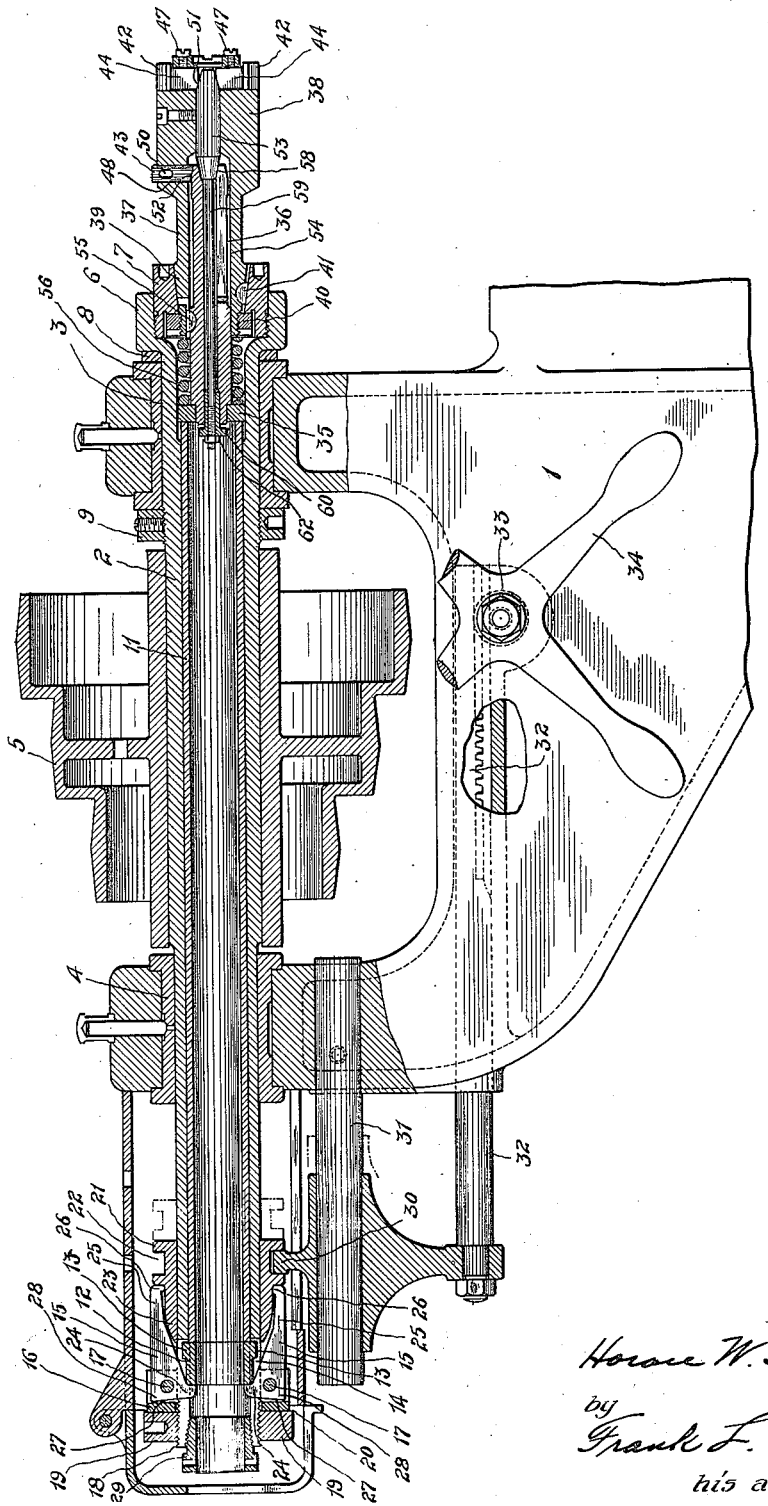

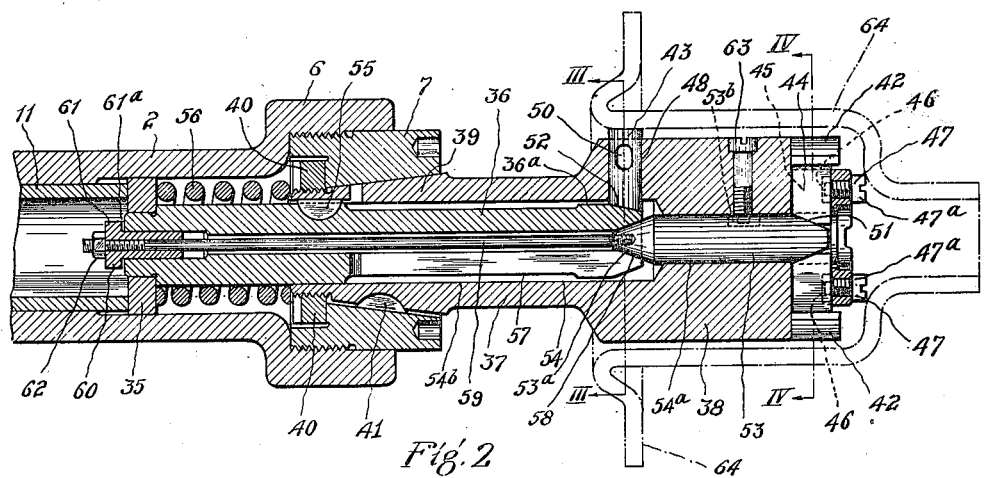
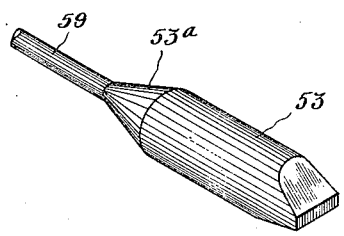
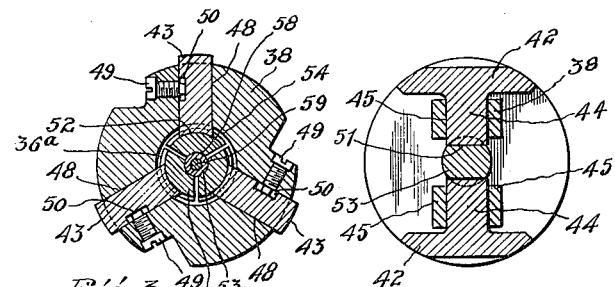
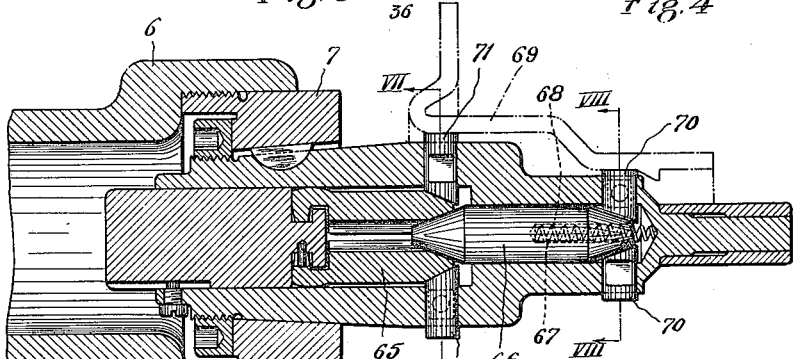
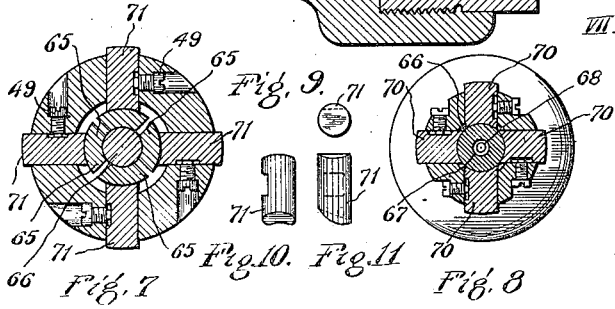

HORACE W. THOMPSON, OF DETROIT, MICHIGAN, ASSIGNOR TO BARDONS AND OLIVER, (COMPOSED OF GEORGE C. BARDONS AND JOHN G. OLIVER,) OF CLEVELAND, OHIO.

LATHE-CHUCK.

1,320,660.   Specification of Letters Patent.   Patented Nov. 4, 1919.

Application filed January 9, 1918. Serial No. 211,016.

*To all whom it may concern:*

Be it known that I, HORACE W. THOMPSON, a citizen of the United States, residing at Detroit, in the county of Wayne and State of Michigan, have invented certain new and useful Improvements in Lathe-Chucks, of which the following is a specification.

My invention relates to work holding chucks in general use upon turret or other metal working machines. More specifically, my invention relates to that type of chuck in which collets or expanding arbors are used for holding the work, or for expanding or contracting the work holding members such as the shoes, jaws or rings of expanding or contracting chucks by which the work is held in order to revolve it against the cutting tool.

The object of my invention is to provide a chuck having more than one set of work holding members adapted to be forced radially from or toward the axis of rotation of the work by operating means embodying compensating devices arranged so that if one set of work holding members contact with the work before the other set, the operating means will continue to act upon the set which is not in contact with the work until it does so contact; so that thereafter the pressure between the separate sets of work holding members and the work will be substantially balanced or equalized; and so that an increase of pressure between one set of work holding members and the work will be transmitted to produce a balancing pressure between the other set and the work.

My invention is particularly useful in chucking hollow, cylindrical parts of considerable length, such, for instance, as hollow, cylindrical castings where it is desired that the machined and finished cylinder have walls of uniform thickness. In the manufacture of such castings, the internal core is frequently not in alinement with the external surface, or, is eccentric to the external surface, or, is otherwise inaccurately made. In order to turn the outside surface of such a casting concentric with the rough, cored hole through its center, it is necessary that the work be centered upon the lathe spindle with reference to the cored hole. My multiple compensating chuck is well adapted to properly handle work of the character just described. It is equally well adapted to handle accurately formed cylindrical work in which the walls are of uniform thickness, and the central openings in the work are concentric with the outer surfaces.

For quantity production of machined parts, it is necessary that the chucking device used for holding such parts be made to operate quickly, and to automatically and accurately position the work with reference to the cutting tool. It is desirable that the chuck be simple and of few parts in order to avoid friction in operation and to make the chuck as efficient as possible.

To attain the object of my invention and to meet the requirements above outlined, I have provided the apparatus described in the following specifications and illustrated in the accompanying drawings in which Figure 1 is a vertical, longitudinal section through the head stock and spindle of a lathe provided with a chuck made in accordance with my invention.

Fig. 2 is an enlarged, longitudinal, vertical section through the chuck shown in Fig. 1.

Fig. 3 is a cross section on line III—III of Fig. 2.

Fig. 4 is a cross section on line IV—IV of Fig. 2.

Fig. 5 is a detail of the plunger shown in Figs. 1 and 2.

Fig. 6 is a horizontal vertical section through a chuck which differs in certain details from that shown in Fig. 1.

Fig. 7 is a cross-section on line VII—VII of Fig. 6.

Fig. 8 is a cross section on line VIII—VIII of Fig. 6.

Figs. 9, 10, and 11 are respectively plan, end and side views of one of the work holding members of the chuck shown in Fig. 6.

Referring to drawings, 1 is a lathe head stock in which the hollow lathe spindle, 2, revolves in bearings, 3, 4. A driving cone pulley, 5, is conventionally shown on the spindle. It is to be understood that the lathe head stock, spindle, driving cone pulley, and chuck operating mechanism, are shown in a more or less conventional manner, as my improvements may be embodied in any suitable machine regardless of the details of the machines construction. A well known type of chuck operating mechanism is shown in Fig. 1 and hereinafter described.

The lathe spindle, 2, is provided with a head, 6, which is recessed and threaded in a well known manner for the reception of an adapter 7. The spindle 2 is held against endwise movement by the spindle head, 6, which is provided with a wearing washer, 8, and by the adjustable thrust collar, 9, which bear upon opposite ends of the bearing, 3.

It will be understood that any other means for preventing and taking up end play of the spindle may be employed, as this feature forms no part of my improvement. Within the hollow spindle, 2, and having a sliding fit thereon is the hollow plunger or rod, 11, which, as shown, is somewhat shorter than spindle, 2. At the rear of the plunger, 11, is a hardened steel thrust follower, 12, which is provided with projections, 13—13, which slide in longitudinal slots, 14—14, in the end of the spindle, 2. The end of spindle, 2, extends out beyond the bearing, 4, and is slotted at 14—14, to receive the bell crank levers or fingers, 15—15, which are pivoted to the sleeve or finger holder, 16, by pins, 17—17. Finger holder, 16, is slidably mounted on spindle, 2. The spindle, 2, is externally threaded at 18 to receive the adjustable thrust collar, 19, which is counterbored at 20 to receive the sleeve, 16.

Upon the spindle, 2, is mounted the sliding wedge collar, 21, which is provided with a shifter groove, 22, and a tapered extension, 23.

The short arms, 24—24, of fingers, 15—15, abut against follower, 12, and the long arms, 25—25, are provided with projections, 26—26, which are adapted to slide upon the tapered extension, 23, of wedge collar, 21.

Slots, 27—27, are formed in sleeve, 16, to receive the fingers 15—15, and these slots are of such a depth in the inner end face of the sleeve as to clear the knuckles, 28—28, of the fingers when the ends, 25—25, are forced outward by the sliding wedge collar, 21.

The spindle, 2, is threaded internally to receive an externally taper-threaded thimble 29, which serves to expand the slotted end of the spindle 2, and securely lock the thrust collar, 19, in its adjusted position.

The wedge collar, 21, is operated by a forked shifter, 30, of usual construction which slides upon a guide 31, which is secured to the head stock of lathe frame. Shifter, 30, is operated by a rack bar, 32, to which it is secured. The rack bar, 32, slides in longitudinal guides in the head stock of lathe frame, and is actuated by the tooth pinion, 33, and star hand-wheel, 34, in a well known manner.

The chuck which is shown mounted in the spindle head, 6, is operated by the movement of push rod, 11, which is made to slide in the spindle, 2, by the mechanism above described, as follows:—

The chuck shoes or work holding members being contracted, the work is placed upon the chuck, and the wedge collar, 21, is shifted toward the fingers, 15. The long arms, 25, of the fingers, 15, are forced outward by the wedge collar, causing the fingers to rock about the pins, 17. The sleeve or finger holder, 16, is forced against thrust collar, 19, and the short arms, 24, of the fingers, 15, engage and push the follower, 12 which in turn, pushes the plunger, 11, forward against thrust collar, 35, which is mounted on and secured to the split collet or plunger, 36. This forces the split plunger, 36, forward to the right as seen in Fig. 1, and causes the work holding members of the chuck to be moved radially into contact with the work in a manner hereinafter described. It will be understood that my multiple compensating chuck may be used upon and other suitable machine and controlled by any other suitable chuck actuating mechanism as well as those shown and described herein without departing from the scope of my invention.

In the form of chuck shown in Figs. 1 and 2, 37 is the 15 chuck body. It comprises the head portion, 38, in which are located the work holding members, and the tapered shank portion, 39, which fits the correspondingly tapered bore of the adapter, 7, and held therein by the nut, 40. A key, 41, forms a driving connection between the adapter, 7, and the chuck head, 38. Two sets of work holding members or chuck shoes are provided, one consisting of two shoes, 42—42, and the other consisting of three shoes, 43—43—43. Shoes, 42, are provided with shanks, 44, which are slidably mounted in radial guides or sockets, 45—45, in the chuck head, 38. A longitudinal slot, 46, is provided in each of the shanks, 44, of the shoes, 42, and into each of these slots, there projects the pivot point of a retaining screw 47, which is screwed into the end of chuck head 38, so that the pivot point of the screw enters slot, 46, and prevents the shoe, 42, from dropping out of place when the chuck is not in use, but does not interfere with the working, radial movement of the shoe. The pivot point of screw, 47, also acts to prevent the shank, 44, from turning in the socket, 45. The heads, 47ª, of screws, 47, are hardened and act as positioning stops for the work in the case of the wheel hub shown in Fig. 2.

Shoes, 43, are not provided with heads, although it will be understood by those skilled in the art that any suitable form of work holding member may be employed which best suits the work to be held.

The shank portions of shoes 43—43—43, slide radially in guides or sockets, 48—48—48, in chuck head, 38, and are prevented from dropping out by the pivot points of screws, 49—49—49, which enter longitudinal slots, 50—50—50, in the shanks, in the same manner that screws, 47, are employed for retaining and guiding shoes, 42.

The work holding members have the ends of their shanks beveled or inclined to the axis of the chuck body as shown at 51 and 52, Fig. 2, to meet correspondingly beveled surfaces upon the plunger, 53, and collet, 36, respectively, in such a manner that movement of the plunger and collet to the right as seen in Fig. 2, forces the shoes, 42 and 43 radially outward. Both plunger, 51, and collet, 36, are free to slide in a central aperture, 54, extending through the chuck body, 37, the aperture, 54$^a$, for the reception of plunger, 53, being of smaller diameter than the aperture, 54$^b$, in which slides the collet or plunger, 36, in the shank portion, 39, of the chuck body. A clearance space, 36$^a$, is provided around the split end of plunger, 36, to permit the latter to expand. A key, 55, is provided to prevent the split plunger, 36, from turning in the aperture, 54$^b$. Plunger, 36, extends inward past the end of chuck body, 37, and has secured to it a nut, 35, forming a thrust collar. Surrounding the projecting portion of split plunger, 36, is a helical spring, 56, which is compressed between the nut, 40, which virtually forms the inner end of the adapter, 7, and the nut or thrust collar, 35. The purpose of the spring, 56, is to withdraw or retract the plunger in order to free the work holding members for the reception or the removal of the work. A central aperture, 57, extends longitudinally through collet, or split plunger, 36, this aperture being enlarged at 58 into a cone shaped or tapered mouth for the reception of the correspondingly tapered end 53$^a$, of plunger, 53, which is telescoped therein. A rod, 59, which is screwed into or made integral with plunger, 53, extends backward through the split plunger, 36, and has mounted upon it a longitudinally adjustable sleeve, 60, provided with a flange, 61, adapted to act as a limit or stop for the relative longitudinal movement in one direction between plunger, 53, and split plunger, 36. The adjusting sleeve, 60, is threaded upon rod, 59, and a jam nut, 62, is provided for securing the sleeve, 60, in any desired position of adjustment. It will be noted that there is a slight clearance space, 61$^a$, between the flange, 61, and the end of plunger, 36, when the chuck shoes are in position to engage the work as seen in Fig. 2. This illustrates how the split plunger, 36, moves a greater distance to the right than plunger, 53, in order to balance the pressure of the two sets of shoes with the work and to compensate for variations in dimensions of the work. It is obvious that if the work be perfect in dimensions and alinement of surfaces, the split plunger, 36, and solid plunger, 53, will both move the same distance as they would if made integral with each other and, under such conditions, the movement compensating and presssure balancing or equalizing functions will not be exercised.

Plunger, 53, has a longitudinal slot at 53$^b$ for the reception of the pivot point of a screw, 63, which is screwed in the chuck head, 38. The point of the screw, 63, holds the plunger, 53, against turning and limits its longitudinal travel in the chuck head.

The operation of my compensating chuck mechanism is as follows:—Assume, for instance, that the work consists of an automobile wheel hub such as is shown in broken lines at 64, Fig. 2, and that the chuck shoes are properly adapted for holding and driving the wheel hub. The chuck shoes are allowed to first contract by turning the hand wheel, 34, in a clockwise direction to move the wedge collar, 21, to the right and relieve the pressure of the levers, 15, upon rod, 11. This allows the spring, 56, to draw the split, spring plunger, 36, and plunger, 53, to the left which permits the chuck shoes to contract. The work consisting of wheel hub, 64, is now placed upon the chuck head, and the hand wheel, 34, is turned so as to cause the rod, 11, to be thrust against the nut or thrust collar, 35, and force the collet, 36, to the right. Movement of collet, 36, to the right causes outward movement of chuck shoes, 43, and movement of plunger, 53, to the right causes outward movement of chuck shoes, 42. If the inner surface of the wheel hub, 64, be perfectly true, both sets of chuck jaws, 42 and 43, will contact with the work at the same time. If, however, for any reason, such as a variation from standard dimensions of the inner diameter of the wheel hub, 64, the shoes, 43, contact with the work in advance of shoes, 42, shoes, 43, will be held against further movement. In such a case, if there were no compensating means provided, the movement of the collet, 36, and plunger, 53, would be stopped, and shoes, 42, would not contact with the work at all. With my improvement, however, when the chuck shoes, 43, contact with the work in advance of chuck shoes, 42, the split collet, 36, collapses upon further movement to the right on account of its tapered end, 52, sliding upon the inner ends of shoes, 43, and at the same time the tapered mouth of collet, 36, contracts upon the tapered end, 53$^a$, of plunger, 53, and forces it farther to the right, driving the shoes, 42, radially outward against the work. The pressure between the shoes, 43, and the work, is thus substantially balanced with that between shoes, 42, and the work, the friction of the sliding surfaces not being great enough to interfere with the compensating action of the parts.

If shoes, 42—42, are the first to contact with the work, the compensating function is performed by the plunger, 53, and split collet, 36, in a similar manner but in the opposite direction to that just described. When shoes, 42, contact with the work in advance of shoes, 43, the movement of plunger, 53, is arrested and thereafter a further movement of split collet, 36, to the right, causes its expansion by engagement with the tapered end, 53ª, of plunger, 53. The shoes, 43, are consequently forced against the work until their pressure balances that of shoes, 42.

Should one shoe of a set contact with the work in advance of the other shoes of the same set, the work will be moved transversely by the contacting shoe until the other shoes of the set also contact with the work.

It will be seen that my improved compensating chuck engages the work with a plurality of sets of work holding members and that the work is centered with reference to the aperture through it, rather than with reference to the external surface. If, now, the outer surface of the work be turned off, its walls will be substantially concentric with the aperture through the center.

In the form of compensating chuck shown in Figs. 6, 7, and 8, there is provided a split collet, or plunger, 65, which is not a spring collet of the type shown at 36. A plunger, 66, shown in Fig. 6, has a central, longitudinal aperture, 67, extending partly through it. In this central aperture, is a helical spring, 68, which abuts against the bottom of the aperture in the chuck head and forces the plunger, 66, to the left when the chuck actuating mechanism is moved to permit the chuck shoes to contract. Spring, 68, thus performs the function of spring, 56, in a modified way.

The compensating and balancing principles of my invention shown in Fig. 2, are embodied in the form of chuck shown in Fig. 6. In Fig. 6, both sets of chuck shoes are composed of four members as is clearly shown in Figs. 7 and 8. The work which is shown as a wheel hub at 69, has two different internal diameters so that one set of chuck shoes, 70—70, acts upon a smaller diameter than does the other set of chuck shoes, 71—71.

While I have herein shown and described my multiple compensating chuck as being made separate from and secured to a turret machine spindle to which it is shown connected by an adapter, the chuck body may be constructed as an integral part of the spindle or spindle head. The chuck may also be used for holding work upon other classes of machine tools such as milling machines, planers, shapers, boring mills, etc. Its adaptation to such other machines will be apparent to those skilled in the art.

It will be understood that the number of shoes, their shapes and dimensions may be varied to suit the particular work which the chuck is designed to hold and that the chuck may be actuated by any suitable controlling devices. It will be further understood that various modifications in the proportions and construction of my invention may be made without departing from its scope.

I claim—

1. In a chuck, a chuck body, two sets of work holding members mounted for radial movement on said chuck body, means for moving the work holding members to engage the work, said means comprising a plunger adapted upon movement to engage one set of work holding members for operation, a split plunger having one end beveled internally to engage said first named plunger for operation, and beveled externally to engage the other set of work holding members for operation, and means for operating said split plunger.

2. In a chuck, a plurality of sets of work holding members, and a series of plungers for operating said work holding members, said plungers being arranged end to end, one of said plungers being adapted when actuated to engage one set of work holding members and move them into work-engaging position, and the next succeeding plunger being adapted when actuated to actuate said first named plunger and engage another set of work holding members and move them into work-engaging position.

3. In a chuck, a chuck body, two sets of work holding members mounted on the chuck body, two axially movable plungers arranged end to end and each adapted to operate one set of work holding members respectively, said plungers having their abutting ends telescoped and the telescoped surfaces beveled, one of said plungers having its telescoped ends split to permit it to expand or contract, and means for operating said plungers.

4. In a chuck, a chuck body, having an axial concentric aperture therethrough, a plurality of sets of work holding members, a plurality of plungers arranged end to end in said aperture each plunger being adapted to respectively operate one set of work holding members said plungers having their abutting ends telescoped and the telescoped surfaces beveled, one of said plungers having its telescoped end split to permit it to expand or contract, and means for operating said plungers.

5. In a chuck, a chuck body, two sets of work holding members mounted for radial movement on said chuck body, means for moving the work holding members to engage the work, said means comprising a plunger adapted upon movement to engage one set of work holding members for operation, a second plunger having one end recessed internally to receive and engage the tapered end of said first named plunger for operation, said second plunger being adapted to engage the other set of work holding members for operation, the end of one plunger in engagement with the other plunger being split to permit it to expand or contract, thereby permitting relative movement of the plungers after some of the work holding members have been arrested by engagement with the work.

6. In a chuck, a plurality of sets of work holding members, a plurality of plungers for operating said work holding members, said plungers being arranged end to end, one of said plungers being adapted to engage one set of work holding members for operation and the next succeeding plunger being adapted to engage said first named plunger and another set of work holding members for operation, said plungers having their abutting ends telescoped and the telescoped ends beveled, one of said plungers having its telescoped end split to permit it to expand or contract, thereby permitting relative movement of the plungers after some of the work holding members have been arrested by engagement with the work.

7. In a chuck, a chuck body, two sets of work holding members mounted on said chuck body, a pair of axially movable plungers arranged end to end, each adapted upon movement to operate one set of work holding members respectively, one of said plungers having an end aperture and the other having a tapered end telescoped therein, one of said telescoped ends being split to permit it to expand or contract, thereby permitting relative movement of the plungers after some of the work holding members have been arrested by engagement with the work.

8. A multiple equalizing chuck comprising a body member, a plurality of sets of work holding members mounted thereon, operating means for simultaneously moving said work holding members into engagement with the work and equalizing the pressure between the work and the several work holding members, said operating means comprising axially movable plungers arranged end to end, each of said plungers being adapted upon movement to operate one set of work holding members respectively, the abutting ends of the plungers being telescoped and the telescoped ends beveled, one of the plungers having its telescoped end split to permit it to expand or contract, thereby permitting relative movement of the plungers after some of the work holding members have been arrested by engagement with the work.

9. In a chuck, two sets of work-holding members, a plunger adapted when actuated to engage one set of work-holding members to move them into work-engaging position, a second plunger adapted to engage the other set of work-holding members to move them into work-engaging position, said second plunger being adapted when actuated to yieldingly engage said first named plunger to actuate it and cause it to move said first named set of work-holding members into work-engaging position.

10. In a chuck, two sets of work-holding members each adapted upon radial movement to engage the work, said work-holding members having radially disposed shanks, a plunger having one end in engagement with the shanks of one set of work-holding members and adapted when actuated to move said set of work-holding members into work-engaging position, said plunger having its opposite end located adjacent to the ends of the other set of work-holding members, a second plunger in engagement with said opposite end of said first named plunger and also in engagement with the second set of work-holding members, said second plunger being adapted when actuated to move said second set of work-holding members into work-engaging position and to simultaneously actuate said first named plunger.

11. In a chuck, two sets of work-holding members, each work-holding member being mounted for radial movement, and two axially-alined abutting plungers each plunger being mounted for longitudinal movement, one of said plungers and one set of work-holding members having coacting engaging portions and the other of said plungers and the other set of work-holding members also having coacting engaging portions whereby a movement of said plungers in one direction moves said work-holding members in a direction to engage the work, said plungers having coacting engaging portions upon their abutting ends, one of said plungers being split and adapted to yieldingly expand or contract to permit relative longitudinal movement of the plungers should the movement of one set of work-holding members be arrested before the movement of the other set of work-holding members is arrested.

12. In a chuck, a plurality of sets of work-holding members, a separate plunger for engaging and moving each set of work-holding members into work-engaging position, said plungers being arranged end to end in abutting contact with each other, the first of said plungers being adapted to engage a set of work-holding members for operation and to be engaged by the next succeeding plunger for operation, said next succeeding plunger being also adapted to simultaneously engage another set of work-holding members for operation.

In testimony whereof I affix my signature in the presence of two witnesses.

HORACE W. THOMPSON.

Witnesses:
 Louis A. Corlett,
 Lucius R. Landyear.